US010304103B2

(12) United States Patent
Thomas et al.

(10) Patent No.: US 10,304,103 B2
(45) Date of Patent: May 28, 2019

(54) METHOD FOR PROVIDING RECOMMENDATIONS FOR DATA ITEM BY COLLABORATIVE VIDEO SERVER

(71) Applicant: Brillio LLC, New Jersey, NJ (US)

(72) Inventors: Renji Kuruvilla Thomas, Bangalore (IN); Gaurav Jain, Bangalore (IN); Venkat Kumar Sivaramamurthy, Bangalore (IN); Puneet Gupta, Bangalore (IN); Karthik Gopalakrishnan Vinmani, Bangalore (IN)

(73) Assignee: BRILLIO LLC, Jersey City, NJ (US)

( * ) Notice: Subject to any disclaimer, the term of this patent is extended or adjusted under 35 U.S.C. 154(b) by 353 days.

(21) Appl. No.: 15/130,293

(22) Filed: Apr. 15, 2016

(65) Prior Publication Data

US 2017/0243270 A1 Aug. 24, 2017

(30) Foreign Application Priority Data

Feb. 23, 2016 (IN) .............................. 201641006226

(51) Int. Cl.
*G06Q 30/06* (2012.01)
(52) U.S. Cl.
CPC ..... *G06Q 30/0613* (2013.01); *G06Q 30/0631* (2013.01)
(58) Field of Classification Search
CPC ................................................ G06Q 30/0613
USPC ....................................................... 705/26.41
See application file for complete search history.

(56) References Cited

U.S. PATENT DOCUMENTS

| 6,925,610 | B2* | 8/2005 | Thurston | ............ | H04N 5/44543 |
| | | | | | 348/E5.105 |
| 7,058,689 | B2 | 6/2006 | Parker et al. | | |
| 7,966,632 | B1* | 6/2011 | Pan | .................... | H04N 5/44543 |
| | | | | | 725/45 |
| 8,959,553 | B1* | 2/2015 | Pan | .................... | H04N 5/44543 |
| | | | | | 725/45 |
| 2003/0126601 | A1* | 7/2003 | Roberts | ............ | G06F 17/30994 |
| | | | | | 725/37 |
| 2004/0003396 | A1* | 1/2004 | Babu | ...................... | G06Q 30/02 |
| | | | | | 725/34 |
| 2005/0177446 | A1 | 8/2005 | Hoblit | | |
| 2006/0032363 | A1* | 2/2006 | Platt | .................. | G06F 17/30038 |
| | | | | | 84/601 |

(Continued)

OTHER PUBLICATIONS

Paliouras, Georgios. "Discovery of Web User Communities and their Role in Personalization." User Modeling and User—Adapted Interaction, vol. 22, No. 1-2, 2012, pp. 151-175. (Year: 2012).*

*Primary Examiner* — Alexis M Casey

(57) ABSTRACT

Embodiments herein provide a computer-implemented method for recommending a recommendation for at least one data item by a collaborative video server. The method includes receiving a data descriptive including at least one data item consumed from a first electronic device when the first electronic device and a second electronic device are in a video event, where the at least one data item is displayed on the second electronic device. Further, the method includes determining a recommendation for the at least one data item and a location information of the recommendation. Further, the method includes causing to display the recommendation corresponding to the at least one data item and the location information on the second electronic device.

20 Claims, 12 Drawing Sheets

(56) References Cited

U.S. PATENT DOCUMENTS

| | | | |
|---|---|---|---|
| 2009/0019488 A1* | 1/2009 | Ruiz-Velasco | G06F 3/0482 |
| | | | 725/43 |
| 2012/0023297 A1 | 1/2012 | Duzly et al. | |
| 2012/0123674 A1* | 5/2012 | Perks | G06Q 30/0631 |
| | | | 701/426 |
| 2013/0030915 A1* | 1/2013 | Statler | G06Q 30/02 |
| | | | 705/14.54 |
| 2013/0054328 A1* | 2/2013 | Chavie | G06Q 50/01 |
| | | | 705/14.23 |
| 2013/0103539 A1 | 4/2013 | Abraham et al. | |
| 2013/0202267 A1 | 8/2013 | Khromov | |
| 2013/0218966 A1 | 8/2013 | Jakobson | |
| 2013/0310112 A1* | 11/2013 | You | H04W 52/0267 |
| | | | 455/566 |
| 2014/0058897 A1* | 2/2014 | Yang | G06Q 30/0623 |
| | | | 705/26.61 |
| 2014/0100993 A1 | 4/2014 | Farmer | |
| 2014/0152847 A1 | 6/2014 | Zomet et al. | |
| 2014/0164401 A1* | 6/2014 | Kyaw | G06F 17/30867 |
| | | | 707/751 |
| 2014/0229835 A1 | 8/2014 | Ravine | |
| 2015/0256793 A1 | 9/2015 | Pycock et al. | |
| 2015/0296179 A1 | 10/2015 | Usbergo et al. | |

\* cited by examiner

METHOD FOR PROVIDING RECOMMENDATIONS FOR DATA ITEM BY COLLABORATIVE VIDEO SERVER

TECHNICAL FIELD

The embodiments herein relate to collaboration systems, and more specifically, relates to a method for recommending a recommendation for at least one data item by a collaborative video server. The present application is based on, and claims priority from an Indian Application Number 201641006226 filed on 23 Feb. 2016, the disclosure of which is hereby incorporated by reference herein.

BACKGROUND

In the conventional systems and methods, a shopping assistance tool provides in-store navigation, customer assistance, and inventory management services, where a navigation tool can be used by a user to receive location of the user's point of interest and receive navigation directions towards it using Global Positioning System (GPS), other satellite or terrestrial location information.

In another conventional systems and methods, the user with a mobile device can send a video of a product in real time; the system will compare the product with identifying data stored in a memory device and provides feedback from other individuals associated with the user to assist the users regarding the information of the products and its offers. The feedback may be in the form of an E-mail, a text message, a voice message, a video, and an online video chat with financial advisor, friend.

SUMMARY

The principal object of the embodiments herein is to provide a computer-implement method for recommending a recommendation for at least one data item by a collaborative video server.

Another object of the embodiments herein is to provide a method for receiving a data descriptive including at least one data item consumed from a first electronic device when the first electronic device and a second electronic device are in a video event, where the at least one data item is displayed on the second electronic device.

Another object of the embodiments herein is to provide a method for determining a recommendation for the at least one data item and a location information of the recommendation.

Another object of the embodiments herein is to provide a method for causing to display the recommendation corresponding to the at least one data item and the location information on the second electronic device.

Another object of the embodiments herein is to provide a method for navigating a user to the location of the at least one data item using Global Positioning System (GPS) or Bluetooth low energy (BLE).

Accordingly the embodiments herein provide a computer-implement method for recommending a recommendation for at least one data item by a collaborative video server. The method includes receiving a data descriptive including at least one data item consumed from a first electronic device when the first electronic device and a second electronic device are in a video event, where the at least one data item is displayed on the second electronic device. Further, the method includes determining a recommendation for the at least one data item and a location information of the recommendation. Further, the method includes causing to display the recommendation corresponding to the at least one data item and the location information on the second electronic device.

In an embodiment, the method includes detecting the recommendation selected by the second electronic device. Further, the method includes sending the selected recommendation and the location information of the selected recommendation to the first electronic device.

In an embodiment, the data descriptive corresponds to a multimedia content of an area showcasing the at least one data item.

In an embodiment, the first electronic device comprises a collaborative agent.

In an embodiment, the recommendation is in proximity to the first electronic device, wherein the recommendation comprises a data item name, description of the data item, a price of the data item, and a price trend of the data item.

In an embodiment, the first electronic device is in a first region and the second electronic device is in a second region.

In an embodiment, the video event is a video call session, an augmented reality session, a remote collaboration session, and a conference call session.

Accordingly the embodiments herein provide a collaborative video server for recommending a recommendation for at least one data item. The collaborative video server including a controller unit configured to receive a data descriptive including at least one data item consumed from a first electronic device when the first electronic device and a second electronic device is in a video event, where the at least one data item is displayed on the second electronic device. Further, the collaborative video server including a recommendation unit configured to determine a recommendation for the at least one data item and a location information of the recommendation. Further, the collaborative video server including a communication unit configured to cause to display the recommendation corresponding to the at least one data item and the location information on the second electronic device.

Accordingly the embodiments herein provide a collaborative system for recommending a recommendation for at least one data item in a video event. The collaborative system including a first electronic device configured to establish the video event with a second electronic device. Further, the first electronic device configured to send a data descriptive comprising at least one data item, wherein the at least one data item is displayed on the second electronic device. Further, collaborative system including a collaborative video server configured to receive the data descriptive comprising the at least one data item consumed from the first electronic device. Further, the collaborative video server configured to determine a recommendation for the at least one data item and a location information of the recommendation. Further, the collaborative video server configured to cause to display the recommendation corresponding to the at least one data item and the location information on the second electronic device.

Accordingly the embodiments herein provide a computer program product comprising computer executable program code recorded on a computer readable non-transitory storage medium, the computer executable program code when executed causing the actions including receiving a data descriptive comprising at least one data item consumed from a first electronic device when the first electronic device and a second electronic device are in a video event, wherein the at least one data item is displayed on the second electronic device. Further, the computer executable program code when executed causing the actions including determining a recommendation for the at least one data item and a location information of the recommendation. Further, the computer executable program code when executed causing the actions including causing to display the recommendation corresponding to the at least one data item and the location information on the second electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
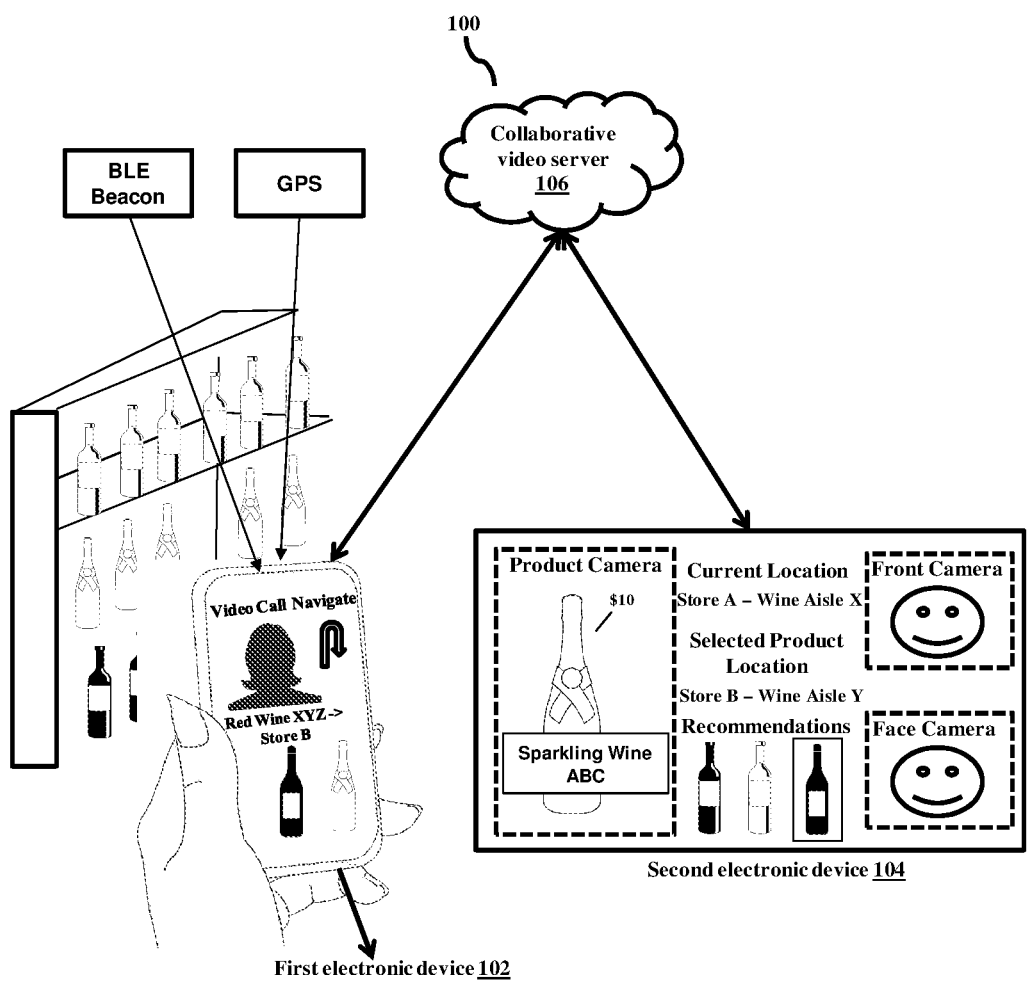
FIG. 1 illustrates an example collaborative system for recommending a recommendation for at least one data item in a video event, according to an embodiment disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly the embodiments herein achieve a method for recommending the recommendation for at least one data item by the collaborative video server. The method includes receiving the data descriptive including at least one data item consumed from the first electronic device when the first electronic device and the second electronic device are in the video event, where the at least one data item is displayed on the second electronic device. Further, the method includes determining the recommendation for the at least one data item and the location information of the recommendation. Further, the method includes causing to display the recommendation corresponding to the at least one data item and the location information on the second electronic device.

In an example, the first electronic device can send the video stream (i.e., data descriptive) of a product (i.e., data item) in a store to the second electronic device. The collaborative video server extracts the video stream of the product from the second electronic device. After extracting the video stream, the collaborative video server recognizes the product and determines similar products (i.e., recommendations). Further, the collaborative video server causes to display the similar products on the second electronic device. Further, the server provides an option to select one of the recommended products along with the location information of the product by a user associated with the second electronic device. Further, the selected recommended product and the location information are shared with the first electronic device. Further, the first electronic device triggers the navigation mode to a first user associated with the first electronic device to the selected recommended product using a Global Positioning System (GPS) or Bluetooth Low Energy (BLE).

Unlike the conventional systems and methods, the proposed mechanism provides a method for remotely collaborating different users to purchase one or more products (i.e., data items) from the same store or the different store. In an example, a Husband can capture the video stream corresponding to the product in the store. Further, the Husband can send the captured video stream to his Wife at home. The Wife, at home, can remotely select complimentary products available at the store which the husband can buy from the store.

Referring now to the drawings, and more particularly to FIGS. 1 through 10, there are shown preferred embodiments.

FIG. 1 illustrates a collaborative system 100 for recommending a recommendation for at least one data item in a video event, according to an embodiment disclosed herein. In an embodiment, the collaborative system 100 includes a first electronic device 102, a second electronic device 104, and a collaborative video server 106. The first electronic device 102 and the second electronic device 104 can be, for example, a laptop, a desktop computer, a mobile phone, a smart phone, Personal Digital Assistants (PDAs), a tablet, a phablet, or the like. In an embodiment, the first electronic device 102 is in a first region and the second electronic device 104 is in a second region.

As shown in the FIG. 1, a first user associated with the first electronic device 102 at a store initiates a video event over an Internet with a second user associated with the second electronic device 104 at a remote location. In an embodiment, the video event can be, for example, a video call session, an augmented reality session, a remote collaboration session, and a conference call session. During the video event, the first user initiates capturing a data descriptive including the data item(s) from a rear camera of the first electronic device 102. In an embodiment, the data descriptive corresponds to a multimedia content of an area showcasing the data items (such as products). Further, the first electronic device 102 can be configured to send the data descriptive including the data items to the collaborative video server 106. After receiving the data descriptive including the data items, the collaborative video server 106 can be configured to determine the recommendation for the data items and location information of the recommendation. Further, the collaborative video server 106 can be configured to cause to display the recommendation for the data items and the location information on the second electronic device 104.

Further, the second user selects the recommendation for the data item and views the location information of the data item. Further, the collaborative video server 106 can be configured to detect the recommendation selected by the second electronic device 104. Further, the collaborative video server 106 can be configured to send the selected recommendation and the location information of the selected recommendation to the first electronic device 102. In an embodiment, the recommendation is in proximity to the first electronic device 102, where the recommendation includes a data item name, description of the data item, a price of the data item, and a price trend of the data item. The first user can view the selected recommendation and navigation is triggered in the first electronic device 102 for the first user to navigate to the suggested recommendation. In an example, the first electronic device 102 can be configured to invoke a navigation mode to locate the recommendation for the data items using a Global Positioning System (GPS) or Bluetooth Low Energy (BLE).

In an embodiment, the first electronic device 102 includes a collaborative agent.

In an example, as depicted in the FIG. 1, the first user captures a video of a product in a store, using the first electronic device 102. The captured video is streamed remotely on the second electronic device 104. The second electronic device 104 uses object recognition and tracking techniques to identify the product in the video. After identifying the product in the video, the second electronic device 104 determines the recommendation to the product in the video. The recommendation includes recommended products, alternatives to the product in the video stream, and complimentary products. The suggested recommendation can be selected by the second user and remotely shared with the first user of the first electronic device 102.

The FIG. 1 shows the collaborative system 100 but it is to be understood that other embodiments are not limited thereon. In other embodiments, the collaborative system 100 may include less or more number of units. Further, the labels or names of the units are used only for illustrative purpose and does not limit the scope of the invention. One or more units can be combined together to perform same or substantially similar function in the collaborative system 100.

Figure 2A:
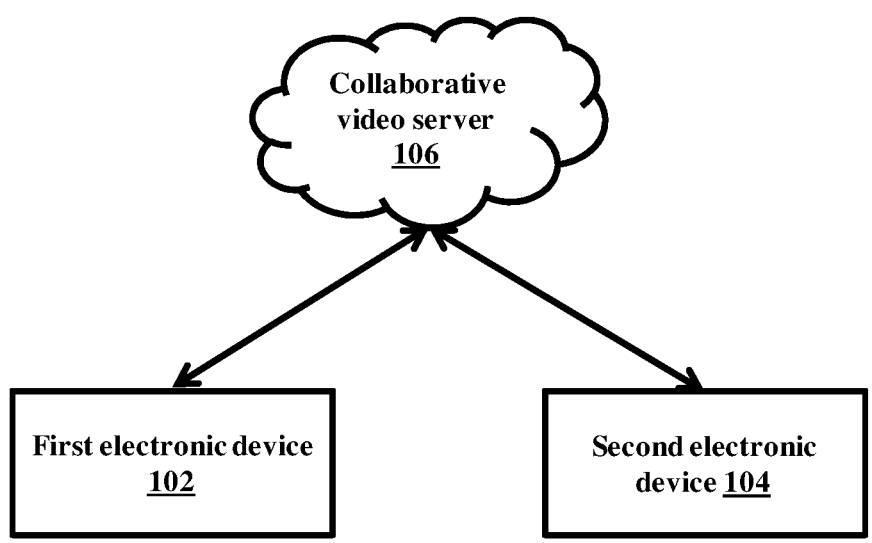
FIGS. 2a-2c illustrate different implementations of a collaborative video server as shown in FIG. 1, according to an embodiment disclosed herein.
Figure 2B:
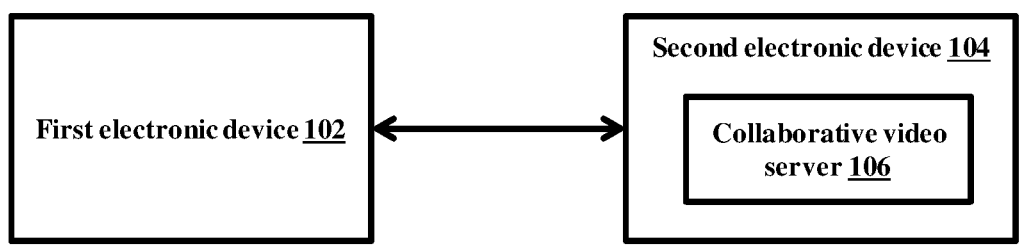
Figure 2C:
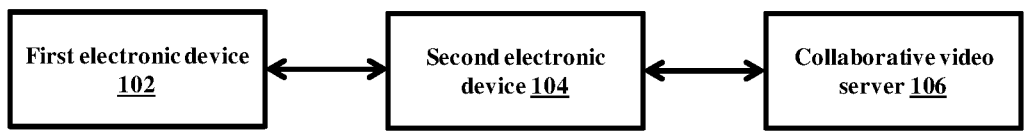

FIGS. 2a-2c illustrate different implementations of the collaborative video server 106 as shown in the FIG. 1, according to an embodiment disclosed herein. As shown in the FIG. 2a, the collaborative video server 106 is in communication with the first electronic device 102 and the second electronic device 104. As shown in the FIG. 2b, the collaborative video server 106 is part of the second electronic device 104. As shown in the FIG. 2c, the collaborative video server 106 is in communication with the second electronic device 104 alone. The functionalities of the first electronic device 102, the second electronic device 104, and the collaborative video server 106 are explained in conjunction with the FIG. 1.

Figure 3:
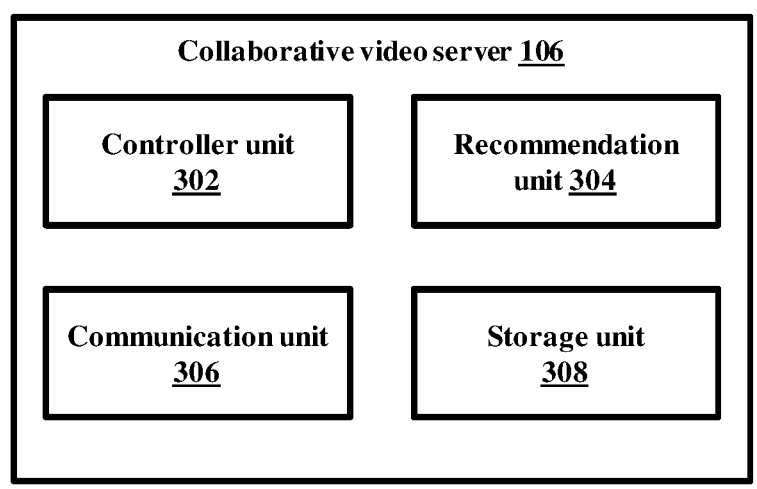
FIG. 3 illustrates various units of a collaborative video server, according to an embodiment disclosed herein.

FIG. 3 illustrates various units of the collaborative video server 106, according to an embodiment disclosed herein. In an embodiment, the collaborative video server 106 includes a controller unit 302, a recommendation unit 304, a communication unit 306, and a storage unit 308.

The controller unit 302 can be configured to receive the data descriptive including the data items consumed from the first electronic device 102 when the first electronic device 102 and the second electronic device 104 are in the video event, where the data items are displayed on the second electronic device 104. The video event can be, for example, the video call session, the augmented reality session, the remote collaboration session, and the conference call session. In an embodiment, the data descriptive corresponds to a multimedia content of an area showcasing the data items (such as products).

Further, the recommendation unit 304 can be configured to determine the recommendation for the data items and the location information of the recommendation. The communication unit 306 can be configured to cause to display the recommendation corresponding to the data items and the location information on the second electronic device 104. Further, the controller unit 302 can be configured to detect the recommendation selected by the second electronic device 104. Further, the controller unit 302 can be configured to send the selected recommendation and the location information of the selected recommendation to the first electronic device 102. In an embodiment, the recommendation is in proximity to the first electronic device 102, where the recommendation includes the data item name, the description of the data item, the price of the data item, and the price trend of the data item.

The storage unit 308 may include one or more computer-readable storage media. The storage unit 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 308 may, in some examples, be considered a non-transitory storage medium. The term "non-transitory" may indicate that the storage medium is not embodied in a carrier wave or a propagated signal. However, the term "non-transitory" should not be interpreted that the storage unit 308 is non-movable. In some examples, the storage unit 308 can be configured to store larger amounts of information than the memory. In certain examples, a non-transitory storage medium may store data that can, over time, change (e.g., in Random Access Memory (RAM) or cache).

The FIG. 3 shows the various units of the collaborative video server 106 but it is to be understood that other embodiments are not limited thereon. In other embodiments, the collaborative video server 106 may include less or more number of units. Further, the labels or names of the units are used only for illustrative purpose and does not limit the scope of the invention. One or more units can be combined together to perform same or substantially similar function in the collaborative video server 106.

Figure 4:
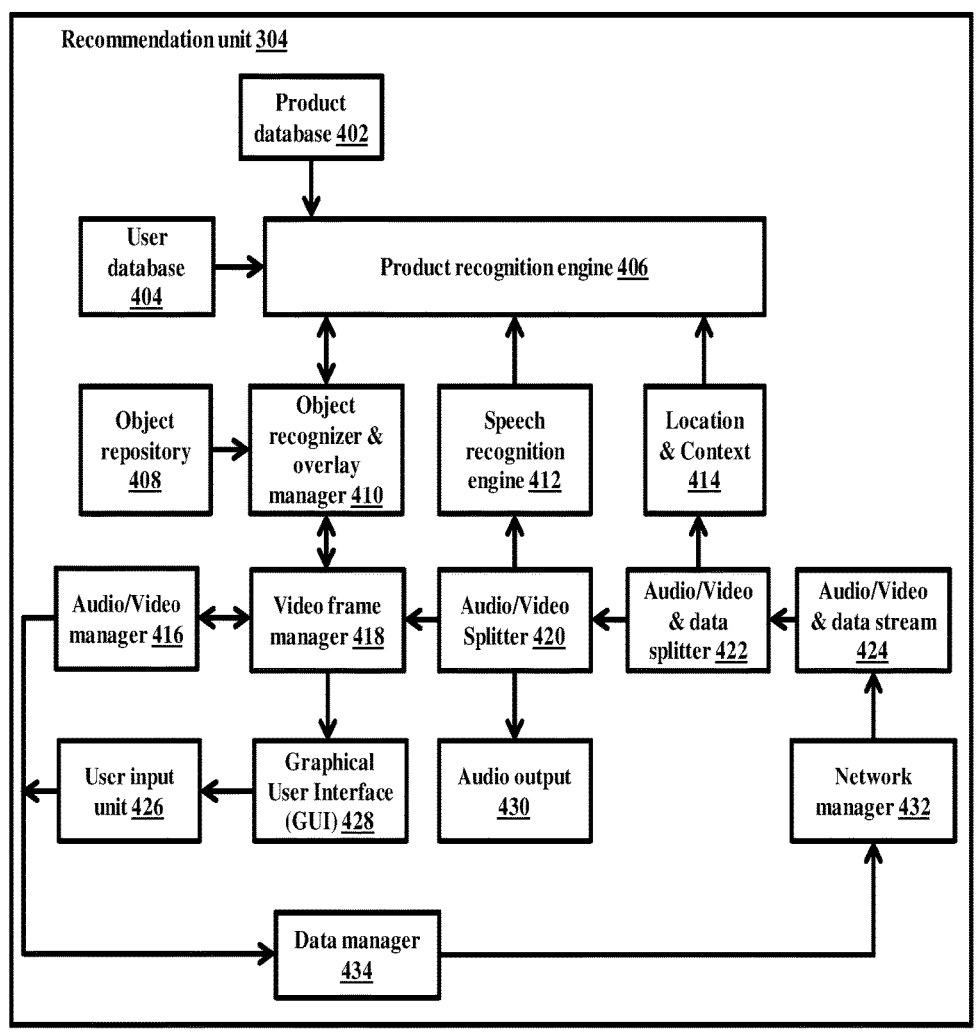
FIG. 4 illustrates various units of a collaborative agent of a collaborative video server, according to an embodiment disclosed herein.

FIG. 4 illustrates various units of the recommendation unit 304 of the collaborative video server 106, according to an embodiment disclosed herein. In an embodiment, the recommendation unit 304 includes a product database 402, a user database 404, a product recognition engine 406, an object repository 408, an object recognizer & overlay manager 410, a speech recognition engine 412, a location & context 414, an Audio/Video manager 416, a Video frame manager 418, an Audio/Video Splitter 420, an Audio/video & data splitter 422, an Audio/video & data stream 424, a user input unit 426, a Graphical User Interface (GUI) 428, an Audio output 430, a network manager 432, and a data manager 434.

The audio, video and data are streamed between the first electronic device 102 and the collaborative video server 106 during the video event. Further, the audio, video, and data stream is split into separate individual streams on the collaborative video server 106. The product database 402 includes the information about the products. The product recognition engine 406 recognizes the products from a camera feed. Further, the object repository 408 stores the information about the objects recognized. The object recognizer & overlay manager 410 recognizes the objects and overlays the information about the same. Further, the speech recognition engine 412 recognizes the audio feed from the video feed. The location & context 414 maintains location information of the products. The Audio/Video manager 416 processes the video feeds. The Video frame manager 418 extracts images from the video feed for further processing for object detection/recognition. The Audio/Video Splitter 420 splits audio and video data from video feed.

Further, the Data stream is location and context which is passed as JSON to the product recognition engine 406. Further, the audio is recognized and synthesized as text, the location and context 414 information from the first electronic device 102 is passed as data to the search and recommender engine. Further, the video frames are captured and passed on to the object recognizer and overlay manager 410 and overlay information on the video frame.

Further, the product recognition engine 406 receives the recognized product name, audio text, location and context to recommend products and then render the same on the GUI of the second electronic device 104 with help of the video frame manager 418. Interactions with the GUI are captured and the selected product information and location is transmitted to the first electronic device 102 along with the Audio & Video data stream 424. The first electronic device 102 displays the received recommendation. The user interactions at the first electronic device 102 are captured and transmitted back to the collaborative video server 106 for further processing. In an embodiment, the first electronic device 102 may use a floor plan of the store and product locations for navigation information within the store. Further, the user of the first electronic device 102 uses the BLE beacons or the GPS for indoor positioning and navigation.

The network manager 432 handles network configurations or management between the first electronic device 102 and collaborative video server 106. The data manager 434 handles data feeds between the first electronic device 102 and the collaborative video server 106.

In an example, the collaborative video server 106 extracts the video stream of the product from the first electronic device 102 and recognizes the product. Further, the collaborative video server 106 sends the recommendation of the similar products to the second electronic device 104 based on the recognized product along with the location details of the product.

The FIG. 4 shows the various units of the recommendation unit 304 but it is to be understood that other embodiments are not limited thereon. In other embodiments, the recommendation unit 304 may include less or more number of units. Further, the labels or names of the units are used only for illustrative purpose and does not limit the scope of the invention. One or more units can be combined together to perform same or substantially similar function in the recommendation unit 304.

Figure 5:
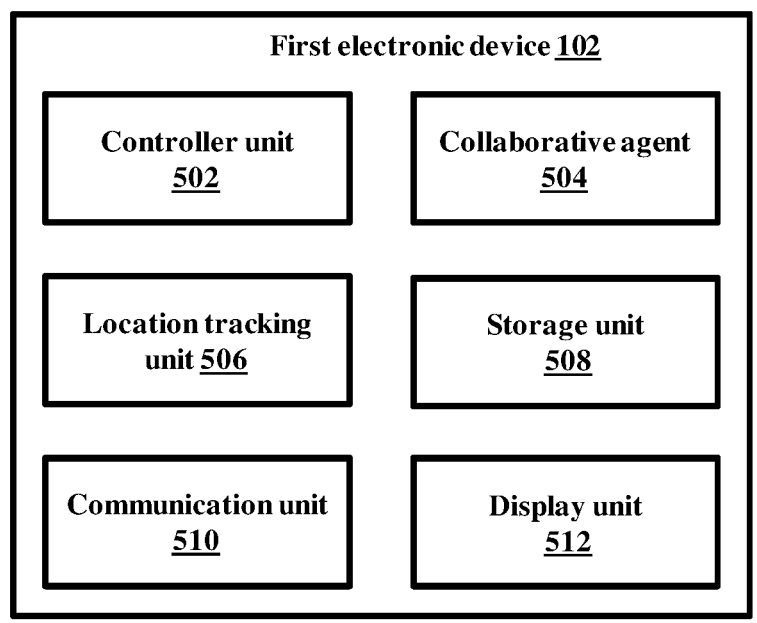
FIG. 5 illustrates various units of a first electronic device, according to an embodiment disclosed herein.

FIG. 5 illustrates various units of the first electronic device 102, according to an embodiment disclosed herein. In an embodiment, the first electronic device 102 includes a controller unit 502, a collaborative agent 504, a location tracking unit 506, a storage unit 508, a communication unit 510, and a display unit 512.

The controller unit 502 can be configured to establish the video event with the second electronic device 104. The video event can be, for example, the video call session, the augmented reality session, the remote collaboration session, and the conference call session. Further, the controller unit 502 can be configured to send the data descriptive including the data items, where the data items are displayed on a display unit of the second electronic device 104. In an embodiment, the data descriptive corresponds to the multimedia content of the area showcasing the data items.

Further, the collaborative agent 504 can be configured to receive the selected recommendation and the location information of the selected recommendation from the second electronic device 104. The location tracking unit 506 can be configured to activate the navigation mode for the first user to navigate to the location of the selected recommendation using the GPS or the BLE.

The storage unit 508 may include one or more computer-readable storage media. The storage unit 508 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 508 may, in some examples, be considered a non-transitory storage medium. The term "non-transitory" may indicate that the storage medium is not embodied in a carrier wave or a propagated signal. However, the term "non-transitory" should not be interpreted that the storage unit 508 is non-movable. In some examples, the storage unit 508 can be configured to store larger amounts of information than the memory. In certain examples, a non-transitory storage medium may store data that can, over time, change (e.g., in Random Access Memory (RAM) or cache). The communication unit 510 can be configured for communicating internally between the units and externally with the second electronic device 104 and the collaborative video server 106.

Further, the communication unit 510 can be configured to receive the selected recommendation from the collaborative video server 106. Further, the display unit 512 can be configured to display the recommendation corresponding to the data item and the location information received from the collaborative video server 106.

The FIG. 5 shows the various units of the first electronic device 102 but it is to be understood that other embodiments are not limited thereon. In other embodiments, the first electronic device 102 may include less or more number of units. Further, the labels or names of the units are used only for illustrative purpose and does not limit the scope of the invention. One or more units can be combined together to perform same or substantially similar function in the first electronic device 102.

Figure 6:
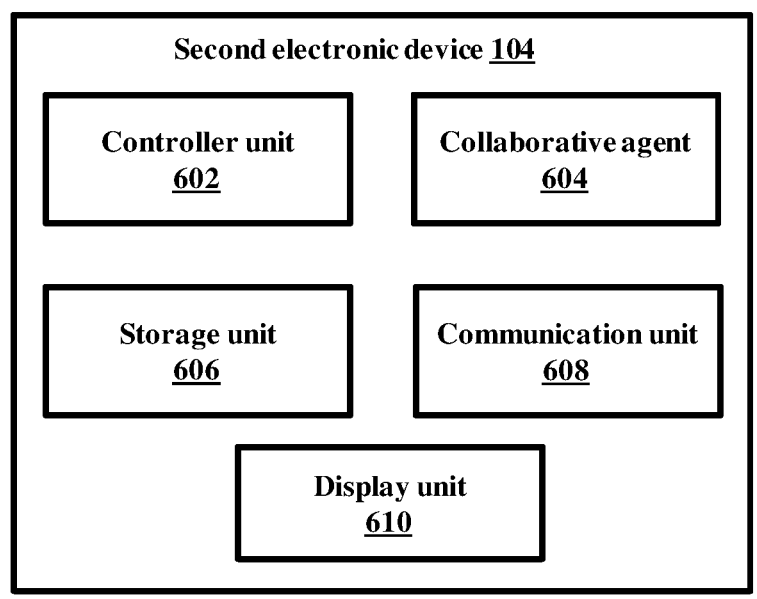
FIG. 6 illustrates various units of a second electronic device, according to an embodiment disclosed herein.

FIG. 6 illustrates various units of the second electronic device 104, according to an embodiment disclosed herein. In an embodiment, the second electronic device 104 includes a controller unit 602, a collaborative agent 604, a storage unit 606, a communication unit 608, and a display unit 610.

The controller unit 602 can be configured to display the recommendation corresponding to the data items on the display unit 610 received from the collaborative video server 106. The recommendation is in proximity to the first electronic device 102, where the recommendation includes the data item name, description of the data item, the price of the data item, and the price trend of the data item. Further, the second user associated with the second electronic device 104 selects the recommendation corresponding to the data item and views the location information of the data item. The collaborative agent 604 can be configured to send the selected recommendation to the first electronic device 102.

The storage unit 606 may include one or more computer-readable storage media. The storage unit 606 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 606 may, in some examples, be considered a non-transitory storage medium. The term "non-transitory" may indicate that the storage medium is not embodied in a carrier wave or a propagated signal. However, the term "non-transitory" should not be interpreted that the storage unit 606 is non-movable. In some examples, the storage unit 606 can be configured to store larger amounts of information than the memory. In certain examples, a non-transitory storage medium may store data that can, over time, change (e.g., in Random Access Memory (RAM) or cache). The communication unit 608 can be configured for communicating internally between the units and externally with the first electronic device 102 and the collaborative video server 106.

The FIG. 6 shows the various units of the second electronic device 104 but it is to be understood that other embodiments are not limited thereon. In other embodiments, the second electronic device 104 may include less or more number of units. Further, the labels or names of the units are used only for illustrative purpose and does not limit the scope of the invention. One or more units can be combined together to perform same or substantially similar function in the second electronic device 104.

Figure 7:
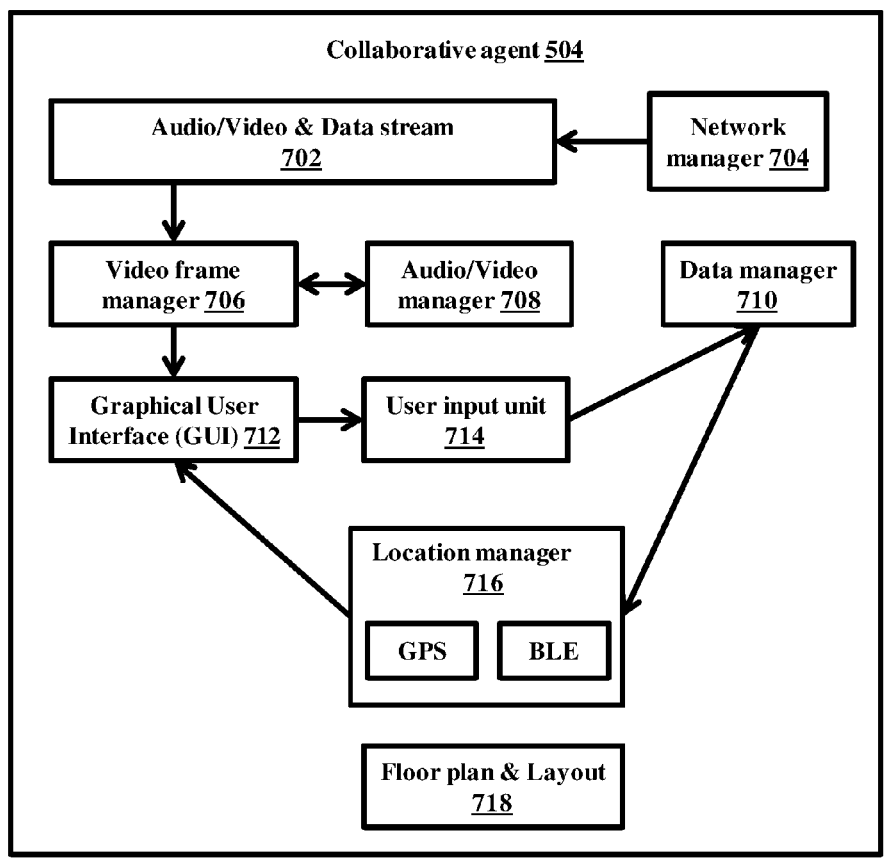
FIG. 7 illustrates various units of a collaborative agent, according to an embodiment disclosed herein.

FIG. 7 illustrates various units of the collaborative agent 504, according to an embodiment disclosed herein. In an embodiment, the collaborative agent 504 includes Audio/Video and data stream 702, network manager 704, video frame manager 706, Audio/Video manager 708, data manager 710, Graphical User Interface (GUI) 712, user input unit 714, location manager 716, and floor plan and layout unit 718.

The network manager 704 handles network configurations or management between the first electronic device 102 and the collaborative video server 106. The Video frame manager 706 extracts images from the video feed for further processing for the object detection/recognition. The Audio/Video manager 708 processes the video feeds. The data manager 710 handles data feeds between the first electronic device 102 and the collaborative video server 106.

The audio, video and data are streamed between the first electronic device 102 and the collaborative video server 106 during the video event. Further, the audio, video, and data stream is split into separate individual streams on the first electronic device 102. Further, the audio is recognized and synthesized as text, the location and context information from the first electronic device 102 is passed as data to the search and recommender engine. Further, the video frames are captured and passed on to the GUI 712. The recommended product is rendered on the GUI 712 of the first electronic device 102 with the help of the video frame manager 706. Further, the selected product information and location is displayed on the first electronic device 102 along with the Audio/Video and data stream 702.

Further, the user interactions at the first electronic device 102 are captured and transmitted back to the collaborative video server 106 for further processing. In an embodiment, the first electronic device 102 may use a floor plan of the store and product locations for navigation information within the store using the floor plan and layout unit 718. Further, the user of the first electronic device 102 uses the BLE beacons or the GPS within the location manager 716 for indoor positioning and navigation.

The FIG. 7 shows the various units of the collaborative agent 504 but it is to be understood that other embodiments are not limited thereon. In other embodiments, the collaborative agent 504 may include less or more number of units. Further, the labels or names of the units are used only for illustrative purpose and does not limit the scope of the invention. One or more units can be combined together to perform same or substantially similar function in the collaborative agent 504.

Figure 8:
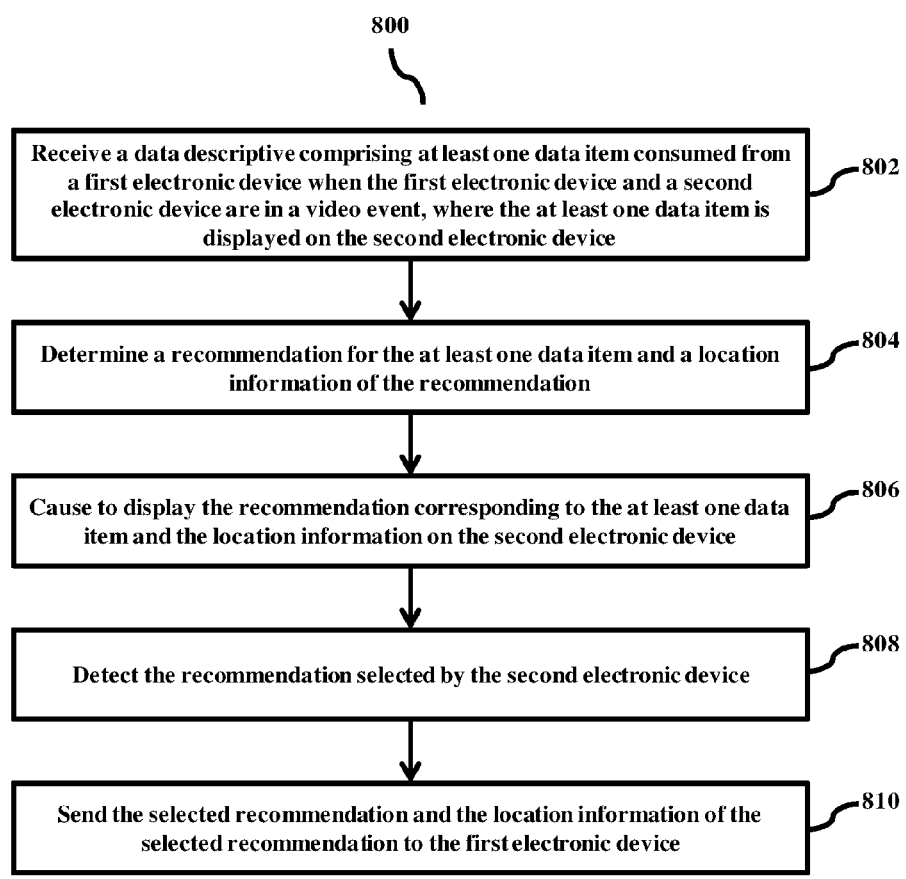
FIG. 8 is a flow diagram illustrating a method for recommending a recommendation for at least one data item by a collaborative video server, according to an embodiment disclosed herein.

FIG. 8 is a flow diagram 800 illustrating a method for recommending the recommendation for the data items by the collaborative video server 106 in the video event, according to an embodiment disclosed herein. At step 802, the method includes receiving the data descriptive including the data items consumed from the first electronic device 102 when the first electronic device 102 and the second electronic device 104 are in the video event. The method allows the controller unit 302 to receive the data descriptive including the data items consumed from the first electronic device 102 when the first electronic device 102 and the second electronic device 104 are in the video event. The data items are displayed on the display unit 608 of the second electronic device 104. In an embodiment, the video event is the video call session, the augmented reality session, the remote collaboration session, and the conference call session.

At step 804, the method includes determining the recommendation for the data items and the location information of the recommendation. The method allows the collaborative agent 304 to determine the recommendation for the data items and the location information of the recommendation. At step 806, the method includes causing to display the recommendation corresponding to the data items and the location information on the second electronic device 104. The method allows the communication unit 306 to cause to display the recommendation corresponding to the data items and the location information on the second electronic device 104.

At step 808, the method includes detecting the recommendation selected by the second electronic device 104. The method allows the controller unit 302 to detect the recommendation selected by the second electronic device 104. At step 810, the method includes sending the selected recommendation and the location information of the selected recommendation to the first electronic device 102. The method allows the controller unit 302 to send the selected recommendation and the location information of the selected recommendation to the first electronic device 102. In an embodiment, the recommendation is in proximity to the first electronic device 102, where the recommendation includes the data item name, description of the data item, the price of the data item, and the price trend of the data item.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 9:
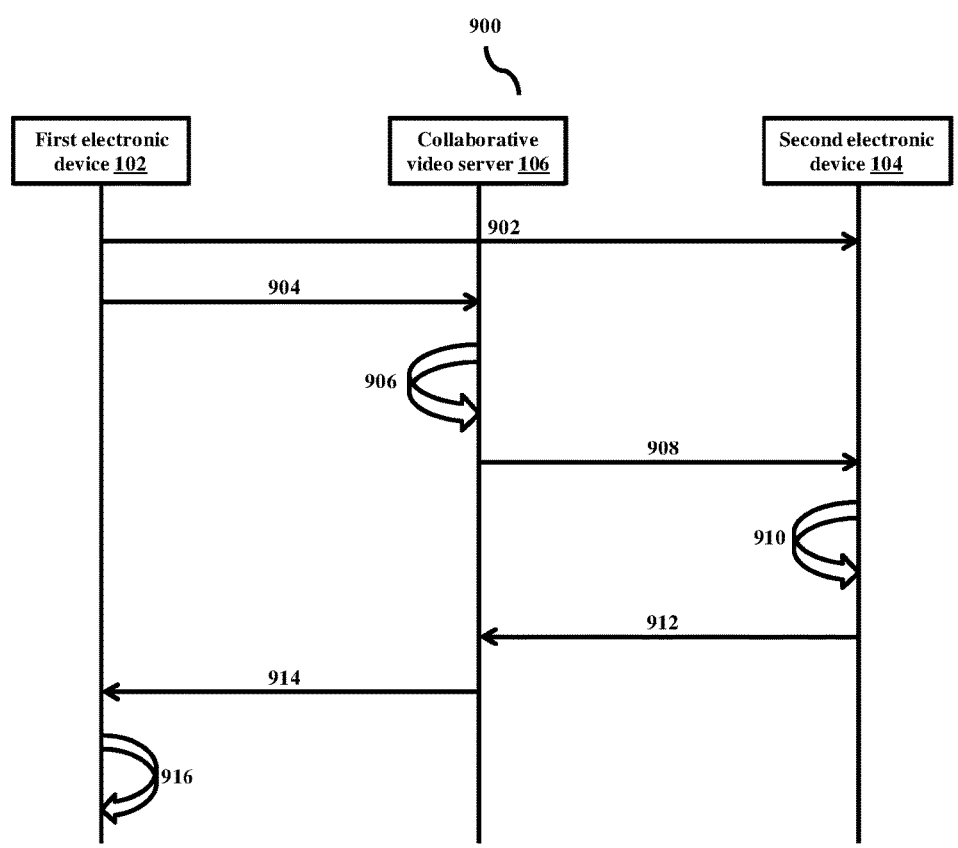
FIG. 9 is a sequence diagram for receiving a recommendation from a second electronic device by a first electronic device, according to an embodiment disclosed herein.

FIG. 9 is a sequence diagram for receiving the recommendation from the second electronic device 104 by the first electronic device 102, according to an embodiment disclosed herein.

At step 902, the first user, using the first electronic device 102, at store initiates the video event over the internet with the second user associated with the second electronic device 104 at a remote location.

At step 904, during the video event, the first user initiates capturing the video from the rear camera of the first electronic device 102. Further, the first electronic device 102 sends the captured video to the collaborative video server 106.

At step 906, after receiving the video including the data items, the collaborative video server 106, using an object recognition technique, detects the product in the video. Once the product is recognized, other recommended products corresponding to the product in the video are determined by the collaborative video server 106.

At step 908, the collaborative video server 106 sends the other recommended products and the location information of the products to the second electronic device 104.

At step 910, the other recommended products are displayed on the second electronic device 104. Further, the second user can select the product and view the location of the product.

At step 912, the collaborative video server 106 receives an indication about the product selected by the second user associated with the second electronic device 104.

At step 914, the collaborative video server 106 sends the selected product and location information to the first electronic device 102.

At step 916, the first electronic device 102 displays the selected product and location information to the first user. The first user can view the selected product and navigation is initiated for the first user to navigate to the selected product.

In an embodiment, the functionalities performed by the collaborative video server 106 can be performed by the second electronic device 104, where the collaborative video server is part of the second electronic device 104.

The various steps in the sequence diagram may be performed in the order presented, in a different order or simultaneously. Further, in some embodiments, some of the steps may be omitted, added, modified, skipped, or the like without departing from the scope of the invention.

Although the above description is described with respective to some specific examples of in store and retail environment but it is to be understood that other embodiments are not limited thereon. A person having ordinary skill in the art can identity that the proposed invention can be adapted in scenarios in which two users are exchanging information with each other in a video event and recommendations for the such information is possible by the server, or other electronic devices. For example, consider a scenario where a conference call session is initiated between the first user associated with the first electronic device 102 and the second user associated with the second electronic device 104. During the conference call session, the first user presents a topic on "Techniques to play cricket", where a document (For example: Word document, PPT document, or a PDF document) is displayed on both the first electronic device 102 and the second electronic device 104. Further, the collaborative video server 106 identifies the data items (example: Bat, Ball, Pads, or the like) within the document; and determines the recommendation for the data items and location information of the data items. Further, the collaborative video server 106 causes to display the recommendation for the data items and the location information.

Figure 10:
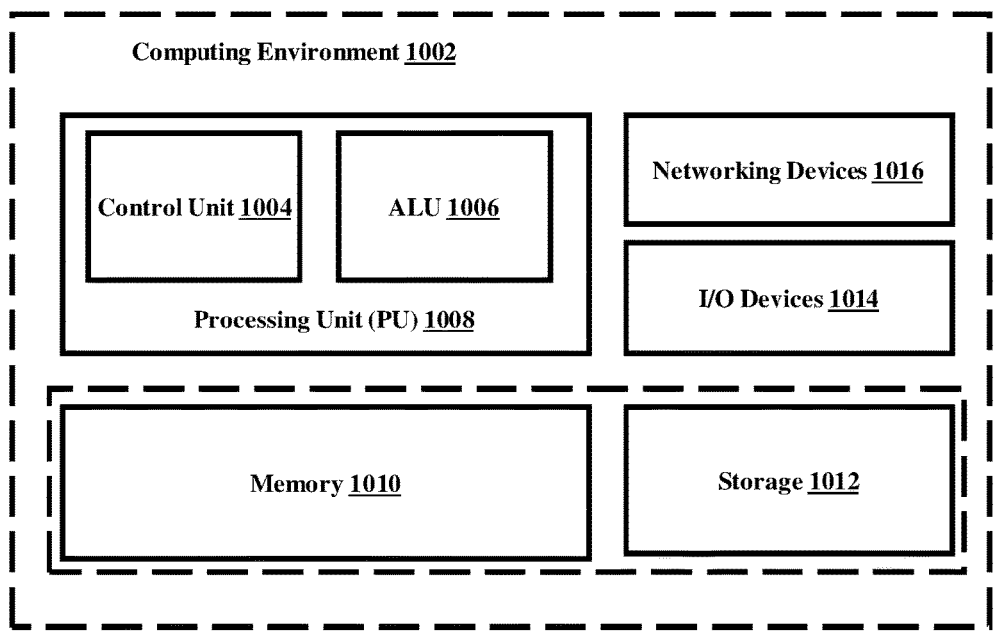
FIG. 10 illustrates a computing environment implementing a system and method for recommending a recommendation for at least one data item by a collaborative video server, according to an embodiment disclosed herein.

FIG. 10 illustrates a computing environment implementing the method and system for automatically triggering the data share event between the first electronic device 102 and the second electronic device 104, according to an embodiment disclosed herein. As depicted in the FIG. 10, the computing environment 1002 comprises at least one processing unit 1008 that is equipped with a control unit 1004 and an Arithmetic Logic Unit (ALU) 1006, a memory 1010, a storage unit 1012, plurality of networking devices 1016 and a plurality Input output (I/O) devices 1014. The processing unit 1008 is responsible for processing the instructions of the schemes. The processing unit 1008 receives commands from the control unit 1004 in order to perform its processing. Further, any logical and arithmetic operations involved in the execution of the instructions are computed with the help of the ALU 1006.

The overall computing environment 1002 can be composed of multiple homogeneous or heterogeneous cores, multiple CPUs of different kinds, special media and other accelerators. The processing unit 1008 is responsible for processing the instructions of the schemes. Further, the plurality of processing units 1008 may be located on a single chip or over multiple chips.

The scheme comprising of instructions and codes required for the implementation are stored in either the memory unit 1010 or the storage 1012 or both. At the time of execution, the instructions may be fetched from the corresponding memory 1010 or storage 1012, and executed by the processing unit 1008.

In case of any hardware implementations various networking devices 1016 or external I/O devices 1014 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 10 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A computer-implement method for recommending a recommendation for at least one data item, the method comprising:
   initiating, by a collaborative agent of a first electronic device, a video call with a second electronic device, wherein the first electronic device is at a store showcasing the at least one data item and the second electronic device is at a remote location, and wherein the store showcasing the at least one data item is a physical store;
   establishing, by the collaborative agent of the first electronic device, a video session corresponding to the video call with the second electronic device;
   capturing, by the collaborative agent of the first electronic device, a data descriptive of the at least one data item showcased in the store using a camera of the first electronic device during the video session;
   sending, by the collaborative agent of the first electronic device, the data descriptive to the second electronic device;
   receiving, by a collaborative agent of the second electronic device, the data descriptive comprising the at least one data item;
   determining, by the collaborative agent of the second electronic device, a recommendation for the at least one data item and a location information of the recommendation in the store;
   displaying, by the collaborative agent of the second electronic device, on the second electronic device the recommendation corresponding to the at least one data item and the location information of the recommendation in the store;
   detecting, by the collaborative agent of the second electronic device, the recommendation selected by a user of the second electronic device;
   sending, by the collaborative agent of the second electronic device, the selected recommendation and the location information of the selected recommendation in the store to the first electronic device;
   displaying, by the collaborative agent of the first electronic device, the selected recommendation and the location information of the selected recommendation in the store; and
   navigating, by the collaborative agent of the first electronic device, by displaying navigation directions indicating directions to locate the recommendation corresponding to the at least one data item in the store in the video session,
   wherein the collaborative agent of the first electronic device and the collaborative agent of the second electronic device comprises a network to handle network configuration between the first electronic device and the second electronic device to establish the video call.

2. The method of claim 1, wherein the navigation directions are generated based on a location of the first electronic device and the location the recommendation in the store in the video session.

3. The method of claim 1, wherein the data descriptive corresponds to a video content of an area of the store showcasing the at least one data item.

4. The method of claim 2, wherein the collaborative agent of the first electronic device navigates to the recommendation in the store by invoking a navigation mode to locate the recommendation for the data item in the store using a Bluetooth Low Energy (BLE) controlled by a location manager in the video session.

5. The method of claim 1, wherein the recommendation comprises a data item name, description of the data item, a price of the data item, and a price trend of the data item.

6. The method of claim 1, wherein determining the recommendation for the at least one data item and the location information of the recommendation in the store comprises:
   recognizing the at least one data item from the data descriptor; and
   determining the recommendation comprising data items corresponding to the at least one recognized data item.

7. The method of claim 1, wherein the video session is one of an augmented reality session, a remote collaboration session, and a video conference call session comprising at least two users.

8. A collaborative system for recommending a recommendation for at least one data item, the collaborative system, comprising a first electronic device comprising a collaborative agent and a second electronic device comprising a collaborative agent having a network to handle network configuration between the first electronic device and the second electronic device, configured to:
   initiate, by the collaborative agent of the first electronic device, a video call with the second electronic device, wherein the first electronic device is at a store showcasing the at least one data item and the second electronic device is at a remote location, and wherein the store showcasing the at least one data item is a physical store;
   establish, by the collaborative agent of the first electronic device, a video session corresponding to the video call with the second electronic device;
   capture, by the collaborative agent of the first electronic device, a data descriptive of the at least one data item showcased in the store using a camera of the first electronic device during the video session;
   send, by the collaborative agent of the first electronic device, the data descriptive to the second electronic device;
   receive, by the collaborative agent of the second electronic device the data descriptive comprising the at least one data item;
   determine, by the collaborative agent of the second electronic device, a recommendation for the at least one data item and a location information of the recommendation in the store;
   display, by the collaborative agent of the second electronic device, on the second electronic device the recommendation corresponding to the at least one data item and the location information of the recommendation in the store;
   detect, by the collaborative agent of the second electronic device, the recommendation selected by a user of the second electronic device;
   send, by the collaborative agent of the second electronic device, selected recommendation and the location information of the selected recommendation in the store to the first electronic device;
   display, by the collaborative agent of the first electronic device, selected recommendation and the location information of the selected recommendation in the store; and navigate, by the collaborative agent of the first electronic device, by displaying navigation directions indicating directions to locate the recommendation corresponding to the at least one data item in the store in the video session.

9. The collaborative system of claim 8, wherein the navigation directions are generated based on a location of the first electronic device and the location the recommendation in the store in the video session.

10. The collaborative system of claim 8, wherein the data descriptive corresponds to a video content of an area of the store showcasing the at least one data item.

11. The collaborative system of claim 8, wherein the second electronic device comprising a collaborative video server to determine the recommendation for the at least one data item and the location information of the recommendation in the store by:
   recognizing the at least one data item from the data descriptor; and
   determining the recommendation comprising data items corresponding to the at least one recognized data item, wherein the recommendation comprises a data item name, description of the data item, a price of a data item name item, and a price trend of a data item.

12. The collaborative system of claim 10, wherein the video session is one of an augmented reality session, a remote collaboration session, and a conference call session comprising at least two users, and wherein the collaborative agent of the first electronic device navigates to the recommendation in the store by invoking a navigation mode to locate the recommendation for the data item in the store using a Bluetooth Low Energy (BLE) controlled by a location manager in the video session.

13. A collaborative system for recommending a recommendation for at least one data item in a video event, the system, comprising a first electronic device having a collaborative agent, and a second electronic device having a collaborative agent, and a collaborative video server having a recommendation unit, configured to:
   initiate, by the collaborative agent of the first electronic device, a video call with the second electronic device, wherein the first electronic device is at a store showcasing the at least one data item and the second electronic device is at a remote location, and wherein the store showcasing the at least one data item is a physical store;
   establish, by the collaborative agent of the first electronic device, a video session corresponding to the video call with the second electronic device;
   capture, by the collaborative agent of the first electronic device, a data descriptive of the at least one data item showcased in the store using a camera of the first electronic device during the video session;
   send, by the collaborative agent of the first electronic device, the data descriptive comprising the at least one data item to the second electronic device and the collaborative video server, wherein the at least one data item is displayed on the second electronic device; and
   receive, by the recommendation unit of the collaborative video server the data descriptive comprising the at least one data item from the first electronic device;
   determine, by the recommendation unit of the collaborative video server, a recommendation for the at least one data item and a location information of the recommendation in the store;
   send, by the recommendation unit of the collaborative video server, the recommendation corresponding to the at least one data item and the location information to the second electronic device;
   receive and display, by collaborative agent of the second electronic device, the recommendation corresponding to the at least one data item and the location information;
   detect, by the collaborative agent of the second electronic device, the recommendation selected by a user of the second electronic device;
   send, by the collaborative agent of the second electronic device, selected recommendation and the location information of the selected recommendation to in the store the first electronic device;
   display, by the collaborative agent of the first electronic device, the selected recommendation and the location information of the selected recommendation in the store; and
   navigate, by the collaborative agent of the first electronic device, by displaying navigation directions indicating directions to locate the recommendation corresponding to the at least one data item in the store in the video session,
   wherein the collaborative agent of the first electronic device and the collaborative agent of the second electronic device comprises a network manager to handle network configuration between the first electronic device and the second electronic device to establish the video call and an audio/video manager to process the data descriptive of the at least one data.

14. The collaborative system of claim 13, wherein the recommendation unit of the collaborative video server determines the recommendation in the store by:
   wherein the second electronic device comprising a collaborative video server to determine the recommendation for the at least one data item and the location information of the recommendation in the store by:
   recognizing the at least one data item from the data descriptor; and
   determining the recommendation comprising data items corresponding to the at least one recognized data item, and wherein the recommendation comprises a data item name, description of the data item, a price of a data item name item, and a price trend of a data item.

15. The collaborative system of claim 13, wherein the data descriptive corresponds to a video content of an area of the store showcasing the at least one data item.

16. The collaborative system of claim 13, wherein the collaborative agent of the first electronic device configured display the navigation directions indicating the directions to the recommendation in the store by invoking a navigation mode to locate the recommendation for the data item in the store using a Bluetooth Low Energy (BLE) controlled by a location manager in the video session, wherein the navigation directions are generated based on a determined customer location to the location of the recommendation in the store in the video session.

17. The collaborative system of claim 13, wherein the video session is one of an augmented reality session, a remote collaboration session, and a video conference call session comprising at least two users.

18. A computer program product comprising computer executable program code recorded on a computer readable non-transitory storage medium, the computer executable program code when executed causing the actions including:

initiating, by a collaborative agent of a first electronic device, a video call with a second electronic device, wherein the first electronic device is at a store showcasing the at least one data item and the second electronic device is at a remote location, and wherein the store showcasing the at least one data item is a physical store;

establishing, by the collaborative agent of the first electronic device, a video session corresponding to the video call with the second electronic device;

capturing, by the collaborative agent of the first electronic device, a data descriptive of the at least one data item showcased in the store using a camera of the first electronic device during the video session;

sending, by the collaborative agent of the first electronic device, the data descriptive to the second electronic device;

receiving, by the collaborative agent of the first electronic device, a recommendation and the location information of the selected recommendation in the store;

receiving, by the collaborative agent of the first electronic device, a recommendation for the at least one data item and a location information of the recommendation in the store from the second electronic device or a collaborative video server;

determining, by the by the collaborative agent of the first electronic device, navigation directions indicating directions to the recommendation in the store based on a location of the first electronic device in the store and the location information of the recommendation; and navigating, by the collaborative agent of the first electronic device, by invoking a navigation mode to locate the recommendation for the data item in the store in the video session.

19. The computer program product of claim 18, wherein the recommendation comprises a data item name, description of the data item, a price of the data item, and a price trend of the data item.

20. The computer program product of claim 18, wherein the vide session is one of an augmented reality session, a remote collaboration session, and a video conference call session comprising at least two users.

* * * * *